United States Patent [19]

Vaz et al.

[11] Patent Number: 4,946,263

[45] Date of Patent: Aug. 7, 1990

[54] OPTICAL DEVICE WITH DIELECTRIC HEATING

[75] Inventors: Nuno A. Vaz, West Bloomfield; Thomas H. VanSteenkiste, Washington; George W. Smith, Birmingham, all of Mich.

[73] Assignee: General Motors Corporation, Detroit, Mich.

[21] Appl. No.: 274,153

[22] Filed: Nov. 21, 1988

[51] Int. Cl.$^5$ .............................................. G02F 1/13
[52] U.S. Cl. .................................... 350/351; 350/336; 350/332; 350/346; 350/331 T
[58] Field of Search .................... 350/331 T, 351, 336, 350/331 R, 346, 332; 219/10.41; 307/520; 784/765, 784, 805

[56] References Cited

U.S. PATENT DOCUMENTS

| | | | |
|---|---|---|---|
| 3,807,831 | 4/1974 | Sovef | 350/336 X |
| 4,031,529 | 6/1977 | Bovel et al. | 350/351 X |
| 4,093,355 | 6/1978 | Kaplit et al. | 350/334 |
| 4,119,842 | 10/1978 | Hayden et al. | 350/331 T X |
| 4,128,311 | 12/1978 | Smith et al. | 350/331 |
| 4,585,311 | 4/1986 | Kawamura et al. | 350/336 X |
| 4,641,156 | 2/1987 | Ohta et al. | 350/331 T X |
| 4,688,900 | 8/1987 | Doane et al. | 350/351 X |
| 4,723,835 | 2/1988 | Franklin | 350/331 R |
| 4,728,547 | 3/1988 | Vaz et al. | 428/1 |
| 4,740,328 | 4/1988 | Fujimura | 350/346 |

FOREIGN PATENT DOCUMENTS

| | | | |
|---|---|---|---|
| 2910571 | 9/1980 | Fed. Rep. of Germany . | |
| 2126365 | 3/1984 | United Kingdom | 350/351 |

OTHER PUBLICATIONS

Paul Horowitz and Wifield Hill, *The Art of Electronics*, Cambridge University Press, 1980, p. 571.

H. G. Craighead, Julian Cheng, and S. Hackwood, New Display Based on Electrically Induced Index Matching in an Inhomogeneous Medium, Appl. Phys. Lett. 40(1), p. 22, 1 Jan. 22, 1982.

James L. Fergason, Polymer Encapsulated Nematic Liquid Crystals for Display and Light Control Applications, SID Digest of Technical Papers 16, p. 68, 1985.

J. W. Doane, N. A. Vaz, B. G. Wu, and S. Zumer, Field Controlled Light Scattering from Nematic Microdroplets, Appl. Phys. Lett. 49(4), p. 269, 27 Jan. 1986.

Nuno A. Vaz, George W. Smith, and G. Paul Montgomery, Jr., A Light Control Film Composed of Liquid Crystal Droplets Dispersed in an Epoxy Matrix, Mol. Cryst. Liq. Cryst., vol. 146, p. 17, 1987.

T. W. Dakin, Insulating Materials, "American Electrician's Handbook", McGraw-Hill, New York, pp. 4–124, 1981.

Nuno A. Vaz and G. Paul Montgomery, Jr., Refractive Indices of Polymer-Dispersed Liquid Crystal Film (List continued on next page.)

*Primary Examiner*—Stanley D. Miller
*Assistant Examiner*—Tai V. Duong
*Attorney, Agent, or Firm*—Tim G. Jaeger

[57] ABSTRACT

In an optical device containing material which is dielectric wherein the device is switchable between an inactive relatively opaque state and an activated relatively transparent state in response to the application of a driving electric field of sufficiently low frequency, a problem may arise in that the switching time between the inactive-opaque state and the activated-transparent state is increased and/or the light transmissivity in the activated-transparent state is decreased when the device is at a relatively low temperature. This problem is alleviated by applying a heating electric field of sufficiently high frequency as to heat the dielectric material while not switching the device to the activated-transparent state thereby raising the temperature of the device to decrease the switching time between the inactive-opaque state and the activated-transparent state and/or to increase the light transmissivity in the activated-transparent state. The dielectric material may be a polymer film containing dispersed liquid crystal droplets.

1 Claim, 2 Drawing Sheets

OTHER PUBLICATIONS

Materials: Epoxy Based Systems, J. Appl. Phys. 62(8), 15 Oct. 1987.

Lev Mikhaylovich Blinov, Electro-Optical and Magneto-Optical Properties of Liquid Crystals, John Wiley & Sons Limited, New York, Chapter 2, 1983.

A. R. Blythe, Electrical Properties of Polymers, Cambridge University Press, Cambridge, 1979.

M. Schadt, Dielectric Properties of Some Nematic Liquid Crystals with Strong Positive Dielectric Anisotropy, J. Chem. Phys. 56, p. 1494, 15 Feb. 1972.

M. Schadt, Low-Frequency Dielectric Relaxations in Nematics and Dual-Frequency Addressing of Field Effects, Mol. Cryst. Liq. Cryst., vol. 89, p. 77, 1982.

M. Schadt, Effects of Dielectric Relaxations and Dual-Frequency Addressing on the Electro-Optics of Guest-Host Liquid Crystal Displays, Appl. Phys. Lett. 41(8), 15 Oct. 1982.

W. H. de Jeu and Th. W. Lathouwers, Mol. Cryst. Liq. Cryst., vol. 26, p. 225, 1982.

G. Baur, A. Stieb, and G. Meier, Controlled Decay of Electrically Induced Deformations in Nematic Liquid Crystals, Appl. Phys. 2, p. 349, 1973.

George W. Smith and Nuno A. Vaz, The Relationship Between Formation Kinetics and Microdroplet Size of Epoxy-Based Polymer-Dispersed Liquid Crystals, Liq. Cryst., vol. 3, No. 5, p. 543, 1988.

T. K. Bose, B. Campbell, S. Yagihara, and J. Thoen, Dielectric-Relaxation Study of Alkylcyanobiphenyl Liquid Crystals Using Time-Doman Spectroscopy, Phys. Rev. A, p. 5767, Dec. 15, 1987.

A. Buka and A. H. Price, Dielectric Relaxation and Order Parameters in the Nematic and Smectic Phases of 4-n-octyl-4'-cyanobiphenyl (8CB), Mol. Cryst. Liq. Cryst. 116, p. 187, 1985.

Frederick G. Yamagishi, Deborah S. Smythe, Leroy J. Miller, and J. David Margerum, Photochemical and Thermal Stability Studies on a Liquid Crystal Mixture of Cyanobiphenyls, Liquid Crystal and Ordered Fluids, vol. 3, p. 475, 1978.

Anna M. Lackner and J. David Margerum, Improved Materials for DC Dynamic Scattering at Elevated Temperatures, Mol. Cryst. Liq. Cryst., vol. 122, p. 111, 1985.

Anna M. Lackner, J. David Margerum, and Camille Van Ast, Near Ultraviolet Photostability of Liquid Crystal Mixtures, Mol. Cryst. Liq. Cryst., vol. 141, p. 289, 1986.

OPTICAL DEVICE WITH DIELECTRIC HEATING

This invention relates to an optical device employing dielectric heating to improve the low temperature performance of the device.

Optical devices that switch between an inactive relatively opaque state and an activated relatively transparent state are commonplace. Problems can arise when this type of optical device is operated at relatively low temperature in that the light transmissivity in the activated-transparent state may be decreased and/or the switching time between the inactive-opaque state and the activated-transparent state may be increased. As an example, optical devices featuring thin polymer films containing dispersed liquid crystal droplets (PDLC) may exhibit these problems.

According to one aspect of the invention, the above-described low temperature performance problems of optical devices are alleviated by employing dielectric heating to raise the temperature of the device. In PDLC devices both the liquid crystal droplets and the polymer matrix are dielectric and can therefore be heated by the application of a suitable high frequency electric field.

In another aspect of the invention, where the optical device contains material (such as PDLC) that is electro-optically switchable in response to the application of a driving electric field of sufficiently low frequency, the required dielectric heating is produced by the application of a heating electric field of sufficiently high frequency as to avoid electro-optically switching the device.

In an additional aspect of the invention, the driving and heating electric fields are generated by mixing a pair of voltages having controllable frequencies so as to develop a composite voltage having sum and difference frequency components. When it is desired to produce both a driving electric field and a heating electric field, the sum and difference frequency components are of appropriate low and high frequencies, respectively. When it is desired to produce a heating electric field only or a driving electric field only, the sum and difference frequency components are either both of appropriate high frequency or both of appropriate low frequency, respectively.

Pursuant to a further aspect of the invention, the heating electric field is developed between a pair of interdigitated electrodes located on the same side of the optical device for ease of fabrication.

The foregoing and other aspects and advantages of the invention may be better understood by reference to the following detailed description in which.

Figure 1:
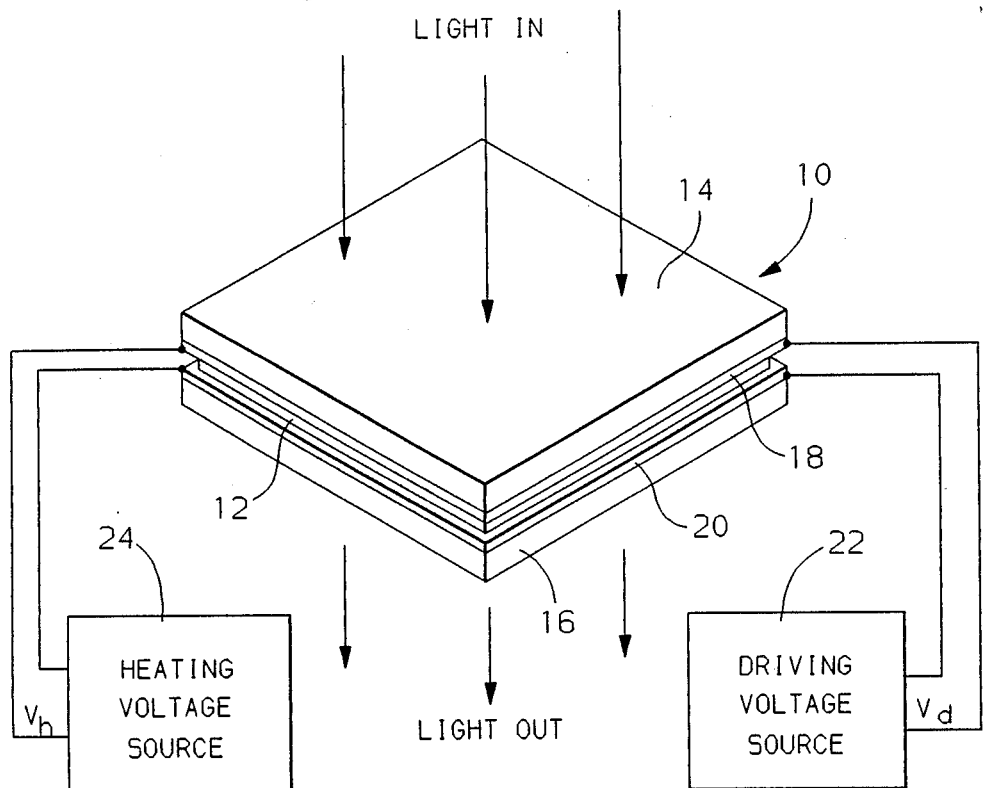
FIG. 1 shows an optical device in accordance with the principles of the invention.

Referring to FIG. 1 (which is exaggerated in scale), an optical device 10 includes a layer of electro-optic material 12 sandwiched between a pair of transparent insulator plates 14 and 16 which may, for example, be glass or plastic. Transparent electrodes 18 and 20, which may be indium-tin-oxide coatings, cover the inner surfaces of the plates 14 and 16, respectively, on either side of the electro-optic layer 12. Preferably, the electro-optical material 12 is a thin polymer film containing dispersed liquid crystal droplets (so-called PDLC material). Examples of PDLC material are described in U.S. Pat. No. 4,728,547 the disclosure of which is incorporated herein by reference.

A source 22 of driving votage $V_d$ is connected across the electrodes 18 and 20 for selectively applying a relatively low frequency driving electric field to the PDLC film 12. When the driving electric field is not applied, the PDLC material 12 is in a relatively opaque "light scattering" state in which the liquid crystal droplets are randomly aligned. When the driving electric field is applied, the PDLC material 12 switches to a relatively transparent "non-light scattering" state in which the liquid crystal droplets are aligned parallel to the electric field direction. The alternation of the driving electric field avoids undesirable bias effects that would otherwise be produced within the liquid crystal droplets if the driving electric field was unidirectional.

The PDLC electro-optic device 10 may be useful in a number of automotive applications requiring variable light transmission, e.g., a flat-panel display, a privacy control window, or a solar control sunroof. In such automotive applications, however, it is important that the optical device 10 be operable down to a relatively low temperature (e.g., −20° C. or even lower). This can present problems in that, at such low temperatures, there may be a pronounced decrease in the light transmissivity of the PDLC material 12 in the activated-transparent state and/or the time required to switch the PDLC material 12 from the inactive-opaque state to activated-transparent state (and vice versa) may be excessively long. The present invention provides a remedy for these problems.

According to the invention, the PDLC electro-optic device 10 is subjected to dielectric heating to raise its temperature and thereby increase its light transmissivity in the activated-transparent state and/or decrease its switching time from the inactive-opaque state to the activated-transparent state (and vice versa). Specifically, a source 24 of heating voltage $V_h$ is connected across the electrodes 18 and 20 for selectively applying a relatively high frequency heating electric field to the PDLC layer 12. Both the polymer matrix and the liquid crystal droplets of the PDLC film 12 are dielectric. Consequently, application of the heating electric field produces dielectric heating of the PDLC material 12.

The amount of heat generated within the electro-optic device 10 is dependent upon the density of polarizable electric dipoles within the PDLC layer 12 and the frequency of the heating electric field. In general, the higher the electric dipole density, the greater the amount of dielectric heating. For most dielectric materials, including the PDLC material 12, maximum dielectric heating occurs at a frequency in the MHz range (which is somewhat inconveniently high). Fortunately, a high density of electric dipoles is present in both the polymer matrix and the liquid crystal droplets of the PDLC material 12. As a result, satisfactory dielectric heating for purposes of the invention can be achieved at electric field frequencies in the KHz range. However, there may be a lower frequency limit as described below.

Where the application of the electro-optic device 10 requires that the heating and driving of the PDLC layer 12 be independent of one another, it is necessary that the frequency of the heating electric field be sufficiently higher than the frequency of the driving electric field that the heating electric field does not cause electro-optic switching of the PDLC film 12. This can be better appreciated by considering the frequency response of the PDLC material 12 which is divisible into adjacent low and high frequency domains. An applied electric field having a frequency within the lower frequency region aligns the liquid crystal parallel to the field direction (this is the activated-transparent state). An applied electric field having a frequency within the higher frequency region aligns the liquid crystal perpendicular to the field direction (an activated-opaque state). The boundary between the low and high frequency regions is the so-called "cross-over" frequency. At frequencies at or near the cross-over frequency, there is a kind of deadband where the applied electric field has little or no electro-optic effect on the liquid crystal.

From the foregoing, it will be apparent that the driving electric field should have a frequency that is well below the cross-over frequency of the PDLC material 12. It is equally apparent that the heating electric field should have a frequency that is near or above the cross-over frequency of the PDLC material 12. Typical PDLC cross-over frequency values are in the several KHz range. This means that the frequency of the heating electric field should be in or above the several KHz range while the frequency of the driving electric field should be no higher than a few KHz at most.

For simplicity of illustration in FIG. 1, the driving voltage source 22 and the heating voltage source 24 are shown as independent voltage sources each connected to the same set of transparent electrodes 18 and 20. Where the driving and heating voltages are simultaneously applied to the electrodes 18 and 20, some undesirable effects may ensue due to cross-coupling between the two voltage sources 22 and 24. One way to avoid these unwanted crosscoupling effects is by time division multiplexing the application of the driving and heating electric fields. A second solution is to combine the driving and heating voltage sources 22 and 24 as shown in FIG. 2.

Figure 2:
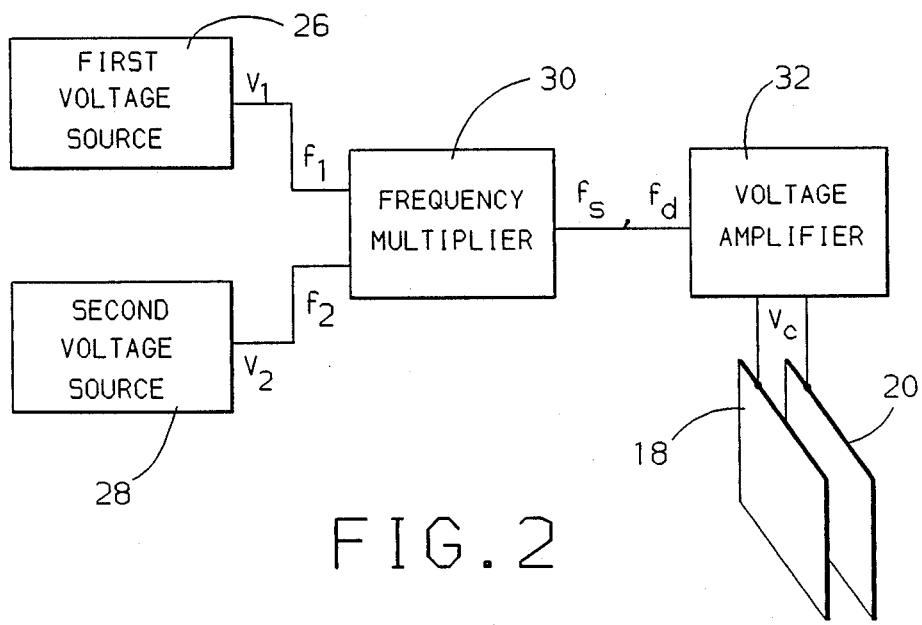
FIG. 2 shows one arrangement for producing the driving and heating electric fields contemplated by the invention.

Referring to FIG. 2, a first voltage source 26 provides a first voltage $V_1$ of controllable frequency $f_1$ and a second voltage source 28 provides a second voltage $V_2$ of controllable frequency $f_2$. The first and second voltages $V_1$ and $V_2$ are mixed together by a frequency multiplier 30 and amplified by a voltage amplifier 32 to provide a composite voltage $V_c$ which is applied across the electrodes 18 and 20 of the electro-optic device 10. Due to the mixing action of the multiplier 30, the composite voltage $V_c$ is composed of a sum frequency component $f_s = (f_1 + f_2)$ and a difference frequency component $f_d = (f_1 - f_2)$.

When it is desired to simultaneously drive and heat the PDLC material 12, the first and second voltage frequencies $f_1$ and $f_2$ are selected to produce a sum frequency $f_s$ that is sufficiently high to heat the material 12 and a difference frequency $f_d$ that is sufficiently low to electro-optically switch the material 12 (e.g., $f_1 = 50$ KHz, $f_2 = 49$ KHz, $f_s = 99$ KHz, $f_d = 1$ KHz). If it is desired to heat the PDLC material 12 only, the first and second voltage frequencies $f_1$ and $f_2$ are selected to produce sum and difference frequencies $f_s$ and $f_d$ that are both sufficiently high to heat the material 12 without electro-optically switching it (e.g., $f_1 = 100$ KHz, $f_2 = 0.1$ KHz, $f_s = 100.1$ KHz, $f_d = 99.9$ KHz). Conversely, if it is desired to drive the PDLC material 12 only, the first and second voltage frequencies $f_1$ and $f_2$ are selected to produce sum and difference frequencies $f_s$ and $f_d$ that are both sufficiently low to electro-optically switch the material 12 without appreciably heating it (e.g., $f_1 = 0.5$ KHz, $f_2 = 0.4$ KHz, $f_s = 0.9$ KHz, $f_d = 0.1$ KHz).

In an arrangement constructed and satisfactorily operated in accordance with FIG. 2, the following components were employed:

| Component | Numeral |
| --- | --- |
| Hewlett-Packard Model No. 3325A | 26 |
| Wavetek Model No. 187 | 28 |
| Princeton Research Associated Model No. 189 | 30 |
| Krohn-Hite Model No. 7500 | 32 |

Referring to FIG. 1, another approach to eliminating undesirable cross-coupling between the driving and heating voltage sources 22 and 24 contemplates modifications to the electrodes 18 and 20. At least two alternative electrode configurations are available. First, two separate sets of electrodes 18 and 20 may be provided, a different set for each of the driving and heating voltage sources 22 and 24, respectively. A second configuration involves dividing one of the electrodes 18 and 20 into two interdigitated electrodes as shown in FIG. 3.

Figure 3:
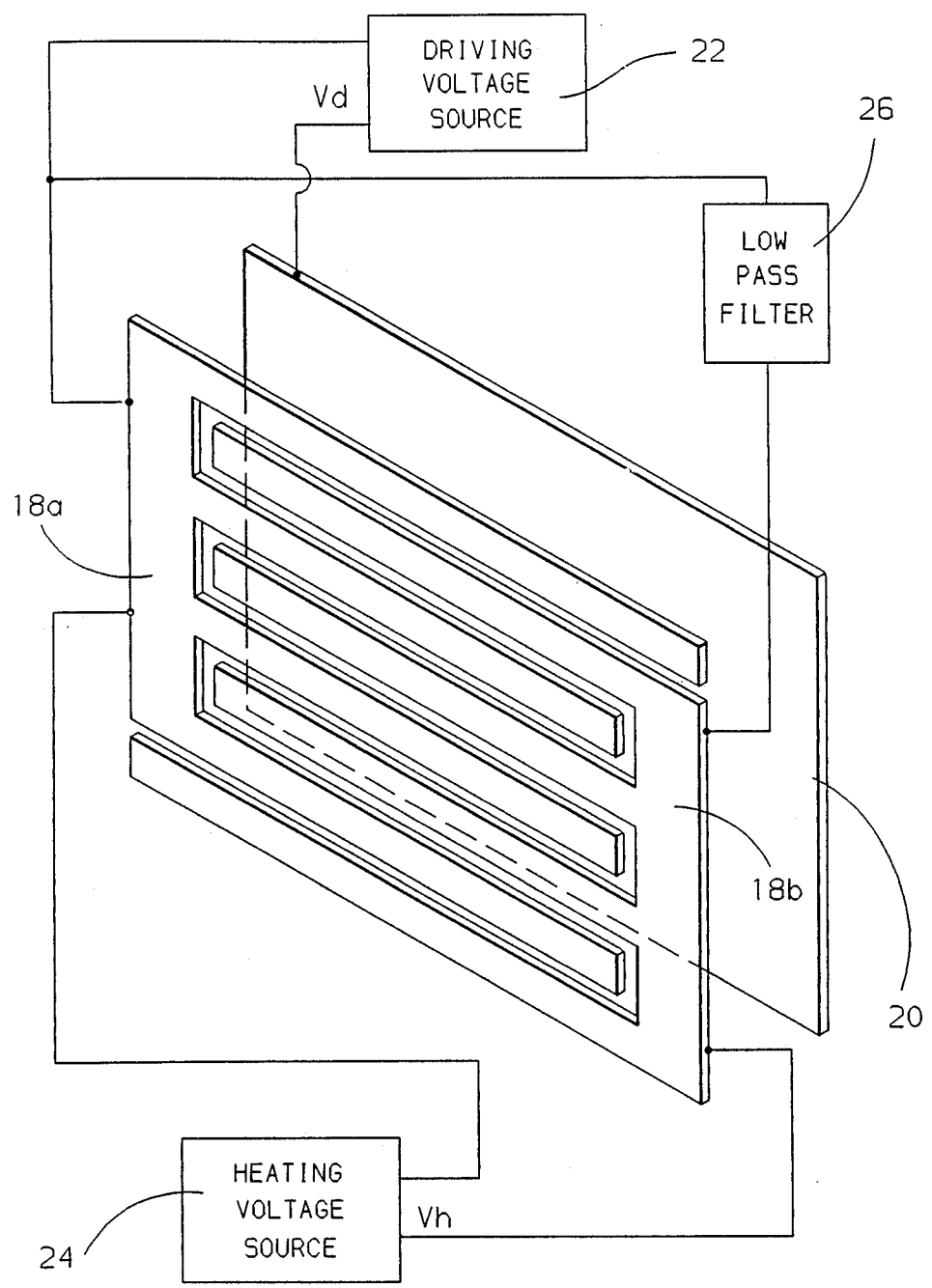
FIG. 3 shows an alternate electrode arrangement for the optical device of FIG. 1.

Referring to FIG. 3, the electrode 18 is formed by two interdigitated electrodes 18a and 18b located on the same side of the PDLC layer 12 for ease of manufacture. In one possible method of fabrication, the interdigitated electrodes 18a and 18b may be formed via a deposition-masking-etching process. The driving voltage source 22 is connected to apply the driving voltage $V_d$ between the electrode 20 and each of the electrodes 18a and 18b, respectively. The heating voltage source 24 is connected to apply the heating voltage $V_h$ between the electrodes 18a and 18b such that the heating electric field appears as a fringing electric field established between adjacent interdigitated fingers of the electrodes 18a and 18b. A low pass filter 26 is inserted between the driving voltage source 22 and the electrode 18b to electrically isolate the interdigitated electrodes 18a and 18b at the high frequency of the heating voltage $V_h$, i.e., the low pass filter 26 acts as a closed switch to the low frequency driving voltage $V_d$ and acts as an open switch to the high frequency heating voltage $V_h$.

It will be appreciated that the foregoing embodiments are intended to illustrate the invention without undue limitation, recognizing that various alterations and modifications may be made to these embodiments without departing from the spirit and scope of the invention. As an example, the invention is not necessarily restricted to optical devices employing PDLC material, but may rather embrace any optical device to which the principles of the invention are applicable.

The embodiments of the invention in which an exclusive property or privilege is claimed are defined as follows:

1. In an optical device containing dielectric material in which the device is switchable between an inactive relatively opaque state and an activated relatively transparent state in response to the application of a driving electric field of sufficiently low frequency wherein the switching time between the inactive-opaque state and the activated-transparent state is increased and/or the light transmissivity in the activated-transparent state is decreased when the device is at a relatively low temperature, and in which a heating electric field is applied to the device sufficiently high frequency as to heat the dielectric material while not switching the device to the activated-transparent state thereby raising the temperature of the device to decrease the switching time between the inactive-opaque state and the activated-transparent state and/or to increase the light transmissivity in the activated-transparent state, the improvement comprising:

a first electrode located on one side of the device, second and third interdigitated electrodes located on an opposite side of the device, means for applying the driving electric field between the first electrode and one of the second and third electrodes, means for applying the heating electric field between the second and third electrodes, and low pass filter means connected between the second and third electrodes for effectively connecting the electrodes together at the low frequency of the driving electric field and for effectively disconnecting the electrodes one from the other at the high frequency of the heating electric field.

* * * * *